# United States Patent Office 3,018,416
Patented Jan. 23, 1962

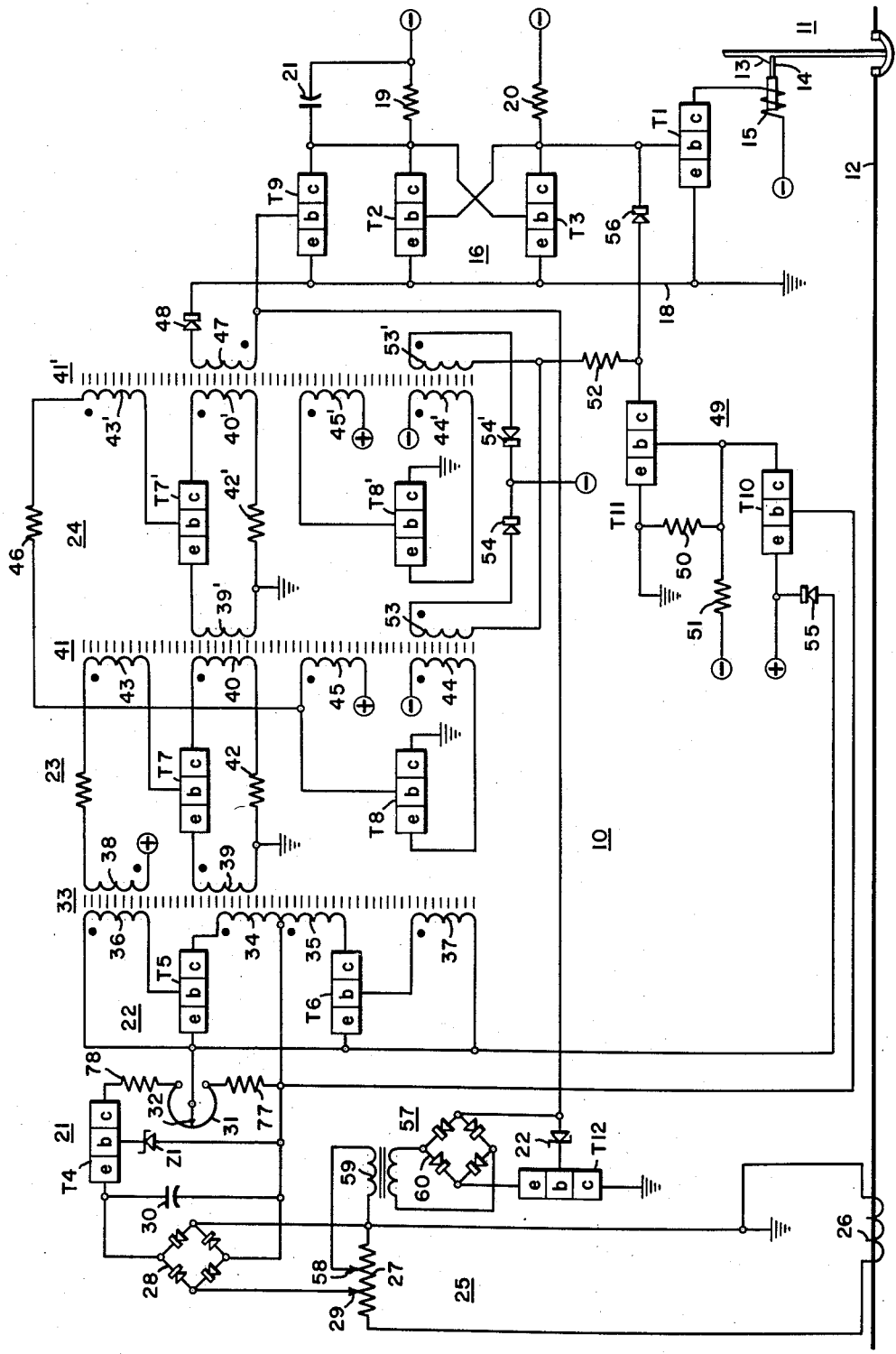

3,018,416
STATIC OVERCURRENT TRIP DEVICE
Robert F. Karlicek, Lombard, Ill., and Jerome Sandin, Forest Hills, Pa., assignors to Westinghouse Electric Corporation, East Pittsburgh, Pa., a corporation of Pennsylvania
Filed Feb. 19, 1959, Ser. No. 794,375
8 Claims. (Cl. 317—36)

This invention relates generally to time delay devices, and it has reference in particular to static time delay devices, such as may be used to trip circuit breakers or the like.

Generally stated, it is an object of this invention to provide a static time delay device having variable delay characteristics.

More specifically, it is an object of this invention to provide a semiconductor delay device having delay characteristics such that the delay decreases as the magnitude of the input signal increases.

Yet another object of this invention is to provide a simple, reliable, static time delay tripping circuit for circuit breakers.

Other objects will, in part, be obvious and will, in part, be hereinafter explained.

In practicing this invention in accordance with one of its embodiments, a transistor Flip-Flop is utilized to effect energization of the trip coil of a circuit breaker. An overcurrent sensing device, including a Zener diode and an adjusting resistor, responds to current from a current transformer to detect the magnitude of the overcurrent. A static inverter responds to the sensing device to provide an output voltage varying in frequency in direct proportion to the magnitude of the voltage across the adjusting resistor. Cascaded static counters provide the time delay in responding to the inverter output to provide an output pulse for operating the Flip-Flop only after counting a predetermined number of the positive pulses of the output frequency. Thus, as the overcurrent increases, the output frequency of the inverter increases, and the time for counting the predetermined number of the positive pulses of the output frequency decreases. A static reset circuit, responsive to a lack of overcurrent, prevents the counters from providing an output to operate the Flip-Flop and maintains the Flip-Flop in the off condition. An instantaneous trip circuit connects the current transformer to directly operate the Flip-Flop through a Zener diode in response to high overcurrents.

For a more complete understanding of the nature and scope of this invention, reference may be made to the following detailed description, which may be read in connection with the accompanying drawing, in which the single FIGURE is a schematic diagram of a trip circuit embodying the invention in one of its forms.

Referring to the drawing figure, the reference numeral 10 denotes generally a variable time delay trip circuit for effecting operation of a circuit breaker 11 to interrupt the circuit through conductor 12. The circuit breaker 11 may be of any conventional type and is shown latched in the closed condition by latch member 13 and trip member 14 which may be operated by trip winding 15. A Flip-Flop circuit 16 is provided to apply a trip signal to trip winding 15 through a transistor amplifier T1.

The Flip-Flop circuit 16 is comprised of a pair of transistors T2 and T3 having their emitters $e$ connected to common through bus 18 and having their collectors $c$ connected through collector resistors 19 and 20 to a suitable negative voltage source. The transistors T2 and T3 are cross-connected, the base $b$ of each transistor being connected to the collector of the other. A capacitor 21 is connected in shunt with resistor 19 so that the charging current thereof initially renders the transistor T3 saturated and renders transistor T2 cut-off to thus place the Flip-Flop in a normal or off condition when power is first applied. The collector $c$ of transistor T3 is connected to the base $b$ of amplifier transistor T1 and since the emitter $e$ of transistor T1 is also connected to common bus 18, the saturation of transistor T3 clamps the base $b$ of transistor T1 to common to render transistor T1 cut-off. When Flip-Flop 16 is triggered to the on condition, in a manner to be hereinafter explained, transistor T2 saturates to increase the base current of transistor T1. This effects saturation of transistor T1 which then conducts to complete a trip circuit from common bus 18, through transistor T1, and trip coil 15, to the negative source.

In order to provide for obtaining a tripping action having a time delay which decreases as the amount of overcurrent increases, a sensing device 21, shown at the left of the drawing, is provided to produce an output voltage as a function of the overcurrent which output voltage operates an inverter 22 which produces an output frequency proportional to the output voltage from the sensing device, and counters 23 and 24 are provided to count a predetermined number of the output pulses from the inverter 22 before providing an output signal to place the Flip-Flop circuit 16 in the on condition.

To the left of the drawing figure there is disclosed an input circuit 25 comprised of a current transformer secondary 26 connected in series with a load resistor 27 and connected to respond to alternating current flowing in conductor 12. A bridge rectifier 28 is connected across a portion of load resistor 27 through a variable tap 29 and cooperates with filter capacitor 30 to provide a direct current output to the sensing device 21.

The sensing device 21 is comprised of a transistor T4 having its emitter-to-base circuit series connected with the rectifier output from bridge 28 and a Zener diode Z1, the rectifier 28 being connected to provide a forward bias to the emitter-to-base circuit, and the Zener diode Z1 being connected to oppose current flow in the forward direction. A load resistor or adjusting resistor 31 is connected in series with the bridge rectifier and the emitter-to-collector path of the transistor T4. When the input voltage from the rectifier 28 to the base-emitter circuit of transistor T4 exceeds the Zener breakdown voltage of Zener diode Z1, thus indicating the presence of an overcurrent condition, transistor T4 saturates and a voltage is thus developed across resistor 31, which voltage is a function of the magnitude of the overcurrent. This function may be controlled by predetermined settings of non-linear resistance units 77 and 78. For example, the non-linear resistance units 77 and 78 may be set so that the voltage delivery to the inverter input is directly proportional to the magnitude of overcurrent in circuit 12. Alternatively, they may be set to give a voltage that is either more or less than directly proportional to the overcurrent in circuit 12. In this manner, the time delay characteristics of the apparatus may be varied to provide coordination with the delay characteristics of the different types of breakers and other devices which may be operated by this time delay apparatus. A portion of the direct current voltage across resistor 31 is tapped off through variable tap 32 to serve as an input to the inverter 22 and thus resistor 31 and tap 32 provide a means of adjusting the voltage from the sensing network to the inverter.

The inverter 22 provides an output frequency proportional to the direct current input voltage and is of the type described in detail in the A.I.E.E. Transactions; part I, Communications and Electronics; July 1955; A Switching Transistor D.-C. to A.-C. Converter having an Output Frequency Proportional to the D.-C. Input Voltage; by G. H. Royer; pp. 322–325. The inverter is comprised of two transistors T5 and T6 connected to a saturable core transformer 33 so that the two transistors alternately conduct to switch a direct current input voltage across different windings of the saturable core transformer thus causing the core flux to be cycled between positive and negative to provide a square wave output from the transformer, the square wave output having a frequency directly proportional to the magnitude of the direct current voltage input. Specifically, transistors T5 and T6 have their emitters $e$ connected to one side of a given portion of resistor 31 through tap 32 while their collectors $c$ are connected through transformer windings 34 and 35, respectively, of transformer 33 to the other side of the given portion of resistor 31. The base and emitter electrodes of transistor T5 are series connected with windings 36 of transformer 33 while the base and emitter electrodes of transistor T6 are series connected with winding 37 of transformer 33. In operation, the application of a direct current voltage from resistor 31 will cause one or the other of transistors T5 and T6 to conduct because of inherent inequalities in the circuits of the respective transistors. When transistor T5 is conducting the voltage drop across the tapped portion of resistor 31 is placed across winding 34 which induces a first voltage in winding 36 causing transistor T5 to continue to saturate, and induces a second voltage in winding 37 causing transistor T6 to cut-off. Transistor T5 conducts until the transformer is saturated, at which point the induced voltage in the transformer disappears to terminate the base drive to transistor T5 which switches to a cut-off condition thus opening the circuit to winding 34. Thereafter, the core flux drops back from maximum saturation to its inherent retentive value and in so doing provides a flux change inducing a voltage of opposite polarity in the windings. This places a negative voltage on the base $b$ of transistor T6 which conducts causing a flux decrease until transistor T6 is conducting heavily. The input voltage from tapped resistor 31 is now across winding 35 to produce saturation of the core in the opposite direction. The output voltage across windings 38 and 39 of transformer 33 is a square wave where the duration of each half cycle is determined by the time necessary for the core flux to change from negative saturation to positive saturation, which in turn is inversely proportional to the magnitude of the input voltage. Therefore, for a given transformer the output frequency of the inverter is proportional to the direct current input thereto, which input in this instance is provided by the previously described voltage drop across resistor 31. The output voltage across windings 38 and 39 provides the input to the counters 23 and 24.

The counters 23 and 24 are connected to operate in cascade to provide an output only after counting a predetermined number of pulses from the inverter and thus impose a time delay varying in magnitude in inverse proportion to the magnitude of the inverter output frequency. These counters are of the type described in detail in the A.I.E.E. Transactions; part I; Communications and Electronics; March, 1955; A High-Accuracy Static Time Delay Device Utilizing Transistors; by G. F. Pittman; pp. 54–58. The counting circuit 23 is comprised of a transistor T7, for saturating a saturable core transformer 41 in response to a predetermined number of input pulses, and a reset transistor T8 for resetting the transformer 41. Specifically, transistor T7 has its emitter $e$ and collector $c$ series connected with output winding 39 of transformer 33, winding 40 of saturable core transformer 41, and a current limiting resistor 42 so as to provide a flux change in transformer 41 in response to a flux change in transformer 33, and having its base $b$ and emitter $e$ series connected with a positive source, which may be 1.5 volts, windings 38 and 39 of transformer 33, winding 43 of transformer 41 and common, so as to permit conduction in the emitter-collector circuit only when the inverter 22 is providing a positive going output pulse in windings 38 and 39. The reset transistor T8 has its emitter $e$ and collector $c$ connected in series with a negative source, which may be 35 volts, winding 44 of transformer 41, and common, so as to reset the transformer 41 to negative saturation. The base $b$ and emitter $e$ of transistor T8 are series connected with the positive source, winding 45 of transformer 41, and common, so as to cause transistor T8 to conduct for permitting reset only in response to an induced voltage in winding 45 caused by the core flux drop from the maximum saturated value back to the residual value at the end of the input pulse. Each positive going output pulse from inverter 22 is thus stored in saturable core transformer 41 as a unidirectional change in flux of a predetermined amount until after a predetermined number of pulses received, the core reaches saturation.

In the operation of counter 23, the application of an input pulse to winding 38 drives the base $b$ of transistor T7 negative thus permitting current flow from emitter to collector. The input pulse induced in winding 39 is thus applied directly to winding 40. As a result of the voltage applied to winding 40, voltages are induced in windings 43 and 45. The voltage induced in winding 43 adds to the existing voltage to render transistor T7 conducting while the voltage induced in winding 45 adds to the bias on the base-emitter circuit of transistor T8 to hold it in a cut-off condition. Negative input pulses are blocked from the input winding 39 by transistor T7 since the voltage induced in winding 38 will be a blocking polarity rendering transistor T7 non-conducting. After a predetermined number of positive inputs, the core of transformer 41 will become saturated. Thereafter, as the core drops from its maximum saturated value back to the residual value at the end of the input pulse, a voltage is induced in the holding winding 45 to overcome the previously described non-conducting bias voltage to thus cause transistor T8 to conduct. The resetting voltage across the collector $c$ and emitter $e$ of transistor T8 is thus applied to winding 44 to initiate resetting of the core. The voltage thus induced on winding 43 blocks transistor T7 while the voltage induced on winding 45 holds transistor T8 conducting until the core is completely reset to negative saturation. The voltage induced in winding 45 during reset of transformer 41 is applied through current limiting resistor 46 as an input to counter 24.

The structure and operation of counter 24 is identical to that of counter 23, except for minor differences to be hereinafter explained; therefore, the elements of counter 24 have been provided with the same reference numerals as the corresponding elements of counter 23, with the addition of a (') as a suffix to distinguish the elements of counter 24. It is to be noted that the initial reverse biasing for the base-emitter circuit of transistor T7' is provided from the positive source through winding 45 of saturable core 41, resistor 46, winding 43' and winding 39' to common, while the forward bias for the same circuit is provided by the voltage induced on winding 45 during reset of transformer 41. The output voltage pulse is induced in winding 47 during resetting of transformer 41' is passed by diode 48 to provide an input signal to operate the hereinbefore described Flip-Flop circuit 16 to the on condition.

It is seen that if each of the saturable cores 41 and 41' are designed to require the same number of input pulses to achieve saturation, such as ten pulses, then one hundred input pulses from inverter 22 are required to saturate the transformer 41' and yield an output pulse.

The output voltage from counter 24 induced upon winding 47 is applied across the base $b$ and emitter $e$ of normally non-conducting coupling transistor T9 which then conducts to clamp the collector $c$ of transistor T2 to common and thus provide operation of Flip-Flop circuit 16 to trip breaker 11 in the manner hereinbefore described.

A reset circuit 49 is provided to reset the Flip-Flop circuit 16 after the breaker 11 has been tripped and after the overcurrent has been removed so that the breaker may be reclosed. The reset circuit 49 also serves to reset the saturable cores 41 and 41' in the event of a momentary overcurrent that did not persist long enough to provide an output to trip the breaker. Specifically, reset circuit 49 includes transistors T10 and T11 coupled to the sensing circuit 21, the Flip-Flop circuit 16 and the saturable cores 41 and 41' to provide the resetting functions hereinbefore described. The transistor T11 is normally biased to conduction by a voltage dropping resistor 50 connected across its emitter e and base b in response to a source and current limiting resistor 51 connected in series across resistor 50 to forwardly bias the emitter-to-base circuit. Transistor T11 conducts to complete a circuit from common through the emitter-to-collector circuit of transistor T10, limiting resistor 52, reset windings 53 and 53' diodes 54 and 54' to the negative 3 volt source, thus maintaining the transformers 41 and 41' in a reset condition. A reset blocking transistor T10 is normally non-conducting to prevent application of a reverse bias across the base b and emitter e of transistor T11. Specifically, the emitter-to-base circuit of transistor T10 includes a diode 55 and the previously described tapped portion of sensing resistor 31 of the sensing circuit 21 so that the voltage drop across resistor 31 caused by the presence of an overcurrent provides a forward bias for the transistor T10 which then conducts. The conducting action of transistor T10 connects the positive source to the base b of transistor T11 to thus switch transistor T10 to a non-conducting condition, which non-conducting condition interrupts current flow to reset windings 53 and 53' to prevent reset of transformers 41 and 41'. When the overcurrent condition terminates, the voltage drop across resistor 31 returns to zero and the transformers 41 and 41' are reset in the manner previously described.

The Flip-Flop circuit 16 is connected to reset to its normal condition in response to the previously described conducting action of transistor T11. Specifically, a diode 56 connects the collector c of transistor T11 to the collector c of transistor T3 and base b of transistor T2. When transistor T11 is conducting to reset transformers 41 and 41' in the manner hereinbefore described, it also connects collector c of transistor T3 to common, thus switching transistor T3 to its normal conducting condition and switching transistor T2 to its normal blocking condition. The conducting condition of transistor T3 clamps the base b of trip transistor T1 to ground to thus block the energization of trip coil 15.

An instantaneous trip circuit 57 is provided to directly operate the Flip-Flop circuit 16 in the event of the occurence of a high overcurrent. A portion of the input voltage across resistor 27 of the input circuit 25 is obtained through variable tap 58 to drive transformer 59 and bridge rectifier 60. A switching transistor T12 is connected to be driven to conduction by the rectified output from the bridge 60 through a Zener diode Z2 in series circuit relationship with the base b and emitter e. The emitter e and collector c of transistor T12 are connected in series circuit relationship with the bridge 60, common, and the base b and emitter e of coupling transistor T9 connected to operate the Flip-Flop circuit 16 as previously described. When a sufficiently high overcurrent condition occurs, Zener diode Z2 breaks down to permit current flow in the forward direction in the emitter-to-base circuit of transistor T12, thus causing T12 to conduct. The conducting action of T12 completes the emitter-to-base circuit through transistor T9 which thus conducts to provide an input signal to operate the Flip-Flop circuit 16.

A complete operation of the entire apparatus will now be described beginning with the normal at rest condition. When no overcurrent condition exists, the voltage impressed upon resistor 27 in the input circuit 25 as a result of the current flow through current transformer 26 is not sufficiently large to cause breakdown of Zener diode Z1 so that transistor T4 is in a blocking or non-conducting condition. Accordingly, no voltage drop is impressed upon sensing resistor 31 so that no input is provided to the inverter 22 or the counters 23 and 24. At the same time, no input is provided to transistor T10 which, therefore, remains in a normally blocking condition to permit the bias source to maintain transistor T11 in a conducting condition for energizing the reset windings 53 and 53', thus preventing a spurious output from operating Flip-Flop circuit 16. The conducting condition of transistor T11 also clamps the output of Flip-Flop circuit 16 to common, thus maintaining it in the off condition.

When an overcurrent condition occurs in conductor 12, current transformer 26 provides a voltage drop across resistor 27 sufficiently large to cause breakdown of Zener diode Z1 which then biases transistor T4 to conduction for providing a voltage drop across resistor 31 proportional to the amount of overcurrent. This voltage drop will produce a small trickle current in the collector-emitter circuit of either one or both of transistors T5 and T6, which trickle current will be greater in one transistor because of inherent differences in their circuit parameters. Transistors T5 and T6 alternately conduct and block in the manner hereinbefore described, to induce an output frequency voltage in windings 38 and 39 of counter 23; which frequency is a function of the magnitude of the overcurrent as presented in the form of a voltage drop across resistor 31 and as controlled by non-linear resistance units 77 and 78. Counter 23 responds to each positive pulse of the output frequency to incrementally advance the saturable core transformer 41 toward saturation, until after a predetermined number of pulses, saturation occurs causing transistor T8 to reset the transformer 41 and at the same time provide an output pulse to operate counter 24 in the same manner, all as hereinbefore described. After a predetermined number of output pulses are provided by counter 23, counter 24 causes saturation of transformer 41 which in turn causes transistor T8' to reset the transformer 41 and at the same time induce an output voltage in winding 47. The output voltage drives transistor T9 to conduction which clamps collector c of transistor T2 to common thus triggering Flip-Flop circuit 16 to the on condition and thus provide a negative output to drive transistor T1 to saturation. The saturation of transistor T1 completes the energizing circuit for trip coil 15, which then operates to open the breaker.

The presence of an overcurrent condition, providing a voltage drop across sensing resistor 31, causes reset blocking transistor T10 to saturate and thus provide a reverse bias for driving reset transistor T11 to a blocking condition preventing energization of reset windings 53 and 53'. Upon termination of the overcurrent condition, transistor T10 returns to the blocking condition to reset transformers 41 and 41' and reset of the Flip-Flop circuit in the manner previously described.

From the foregoing description and the accompanying drawings, it will be apparent that there has been provided a static time delay control circuit providing a time delay which is a variable function of the amount of overcurrent, and which has no moving parts. The various elements of the different circuits are obviously readily adjustable, as desired, to provide sensitivity to different ranges of overcurrents and different basic rates of time delay.

Since certain changes may be made in the above described construction and different embodiments of the invention may be made without departing from the spirit and scope thereof, it is intended that all matter contained in the above description and shown in the accompanying drawings shall be considered as illustrative and not in a limiting sense.

We claim as our invention:
1. A control circuit for a circuit breaker comprising:

means for providing a voltage having a magnitude which varies in accordance with the magnitude of an overcurrent in the circuit; means for providing an output signal having a frequency which varies directly with the magnitude of the voltage; and means for providing a control signal in response to a predetermined number of cycles of said output signal to trip the breaker.

2. A control circuit for a circuit breaker comprising: means for sensing the magnitude of an overcurrent in the circuit and including means providing an output which varies directly with the magnitude of the overcurrent; a static inverter for providing an output frequency directly proportional to the magnitude of the output; means including saturable core means for providing a control signal in response to a predetermined number of cycles of said output frequency to trip the breaker.

3. A control circuit for a circuit breaker comprising: means for providing an output frequency which varies directly with the magnitude of an overcurrent in the circuit; saturable core means; circuit means for applying the output frequency pulses to the saturable core means, whereby the core saturates after a predetermined number of pulses; reset means for the saturable core; means responsive to a change in flux in the core means from the saturation value to residual value to actuate the reset means; means responsive to reset of the saturable core to provide an output control signal to trip the breaker.

4. A control circuit for a circuit breaker comprising: means providing an output frequency which varies directly with the magnitude of an overcurrent in a monitored circuit; saturable core means; circuit means for applying the output frequency pulses to the saturable core means, whereby the core saturates after a predetermined number of pulses; reset means for the saturable core; means responsive to a change in flux in the core means from the saturation value to residual value to actuate the reset means; means responsive to reset of the saturable core to provide an output control pulse to trip the breaker; additional reset means normally maintaining the saturable core means in a reset condition; and means responsive to overcurrent conditions in the circuit to prevent operation of the additional reset means.

5. A control circuit for a circuit breaker comprising: means providing a signal having a magnitude which varies directly with the magnitude of an overcurrent in the circuit; inverter means responsive to said signal to provide an output frequency proportional to the magnitude of said signal; means providing an output control pulse only after counting a predetermined number of cycles of the inverter output frequency; a Flip-Flop having two stable states and operable to one of said two stable states in response to the control pulse to trip the breaker; and means initially operating the Flip-Flop to the other of said two stable states.

6. A control circuit for a circuit breaker comprising: means for providing an output voltage having a frequency proportional to the magnitude of an overcurrent in the circuit; means for counting a predetermined number of cycles of said output frequency; means for resetting the counting means upon completion of a counting operation; means responsive to the operation of the reset means to provide an output control pulse to trip the breaker.

7. A control circuit for a circuit breaker comprising means providing an output voltage having a frequency proportional to the magnitude of an overcurrent in the circuit; means for counting a predetermined number of cycles of said output frequency; means for resetting the counting means upon completion of a counting operation; means responsive to the operation of the reset means to provide an output control pulse to trip the breaker; means normally maintaining the counting means in a reset condition; and means responsive to overcurrent conditions in the circuit for preventing operation of said reset maintaining means.

8. A control circuit for a circuit breaker comprising: means providing an output voltage having a frequency proportional to the magnitude of the overcurrent; means for counting a predetermined number of cycles of said output frequency; means for resetting the counting means upon completion of a counting operation; means responsive to the operation of the reset means to provide an output control pulse; Flip-Flop means responsive to said output control pulse to provide a continuous output control signal to trip the breaker; means normally maintaining the counting means and the Flip-Flop means in a reset condition; and means responsive to operation of the sensing means for preventing operation of said reset maintaining means.

References Cited in the file of this patent
UNITED STATES PATENTS

| | | |
|---|---|---|
| 2,547,217 | Kraayeveld | Apr. 3, 1951 |
| 2,591,406 | Carter | Apr. 1, 1952 |
| 2,602,140 | Fink | July 1, 1952 |
| 2,875,382 | Sandin | Feb. 24, 1959 |
| 2,920,242 | Koss | Jan. 5, 1960 |